United States Patent [19]
Donnelly et al.

[11] Patent Number: 5,456,574
[45] Date of Patent: Oct. 10, 1995

[54] CENTRIFUGAL PUMP WITH STARTING STAGE

[75] Inventors: Brian G. Donnelly, Suffield; Charles E. Reuter, Granby, both of Conn.

[73] Assignee: United Technologies Corporation, Hartford, Conn.

[21] Appl. No.: 349,135

[22] Filed: Dec. 2, 1994

Related U.S. Application Data

[63] Continuation of Ser. No. 101,554, Aug. 3, 1993, abandoned.

[51] Int. Cl.[6] ........................................ F04D 9/04
[52] U.S. Cl. .................... 415/28; 415/55.5; 415/143; 415/146; 415/198.1; 415/26; 417/69
[58] Field of Search ................ 415/26, 28, 29, 415/30, 55.5, 56.1, 59.1, 144, 146, 198.1, 143; 417/69

[56] References Cited

U.S. PATENT DOCUMENTS

| | | | |
|---|---|---|---|
| 2,464,144 | 3/1949 | McConaghy | 415/18 |
| 3,147,712 | 9/1964 | Gaubatz | 60/39.281 |
| 3,518,028 | 6/1970 | Minick . | |
| 3,576,375 | 4/1971 | Jackson | 415/18 |
| 4,347,041 | 8/1982 | Cooper | 415/26 |
| 4,487,548 | 12/1984 | Leachman, Jr. et al. | 415/26 |
| 5,096,386 | 3/1992 | Kassel | 417/69 |

FOREIGN PATENT DOCUMENTS

| | | |
|---|---|---|
| 407420 | 2/1968 | Australia . |
| 0398377 | 11/1990 | European Pat. Off. . |
| 2034427 | 1/1971 | Germany . |
| 601516 | 6/1948 | United Kingdom . |
| 89/05904 | 6/1989 | WIPO . |
| 9106778 | 5/1991 | WIPO . |

*Primary Examiner*—Edward K. Look
*Assistant Examiner*—James A. Larson
*Attorney, Agent, or Firm*—Donald S. Holland; Holland & Associates

[57] ABSTRACT

A novel centrifugal pumping system is disclosed for supplying fuel to aircraft gas turbines. The system has a common rotor with two different sets of impeller blades on opposite sides. A regenerative/liquid-ring starting pump is located on one side of the rotor, and a centrifugal impeller is located on the other. During engine start-up, the regenerative/liquid-ring pump is capable of priming itself and supplies engine fluid and pressure. The starting pump delivers fuel until the main pump reaches a speed sufficient to provide adequate pressure for fuel delivery. At that time, the starting pump is switched off, via a valving system.

5 Claims, 4 Drawing Sheets

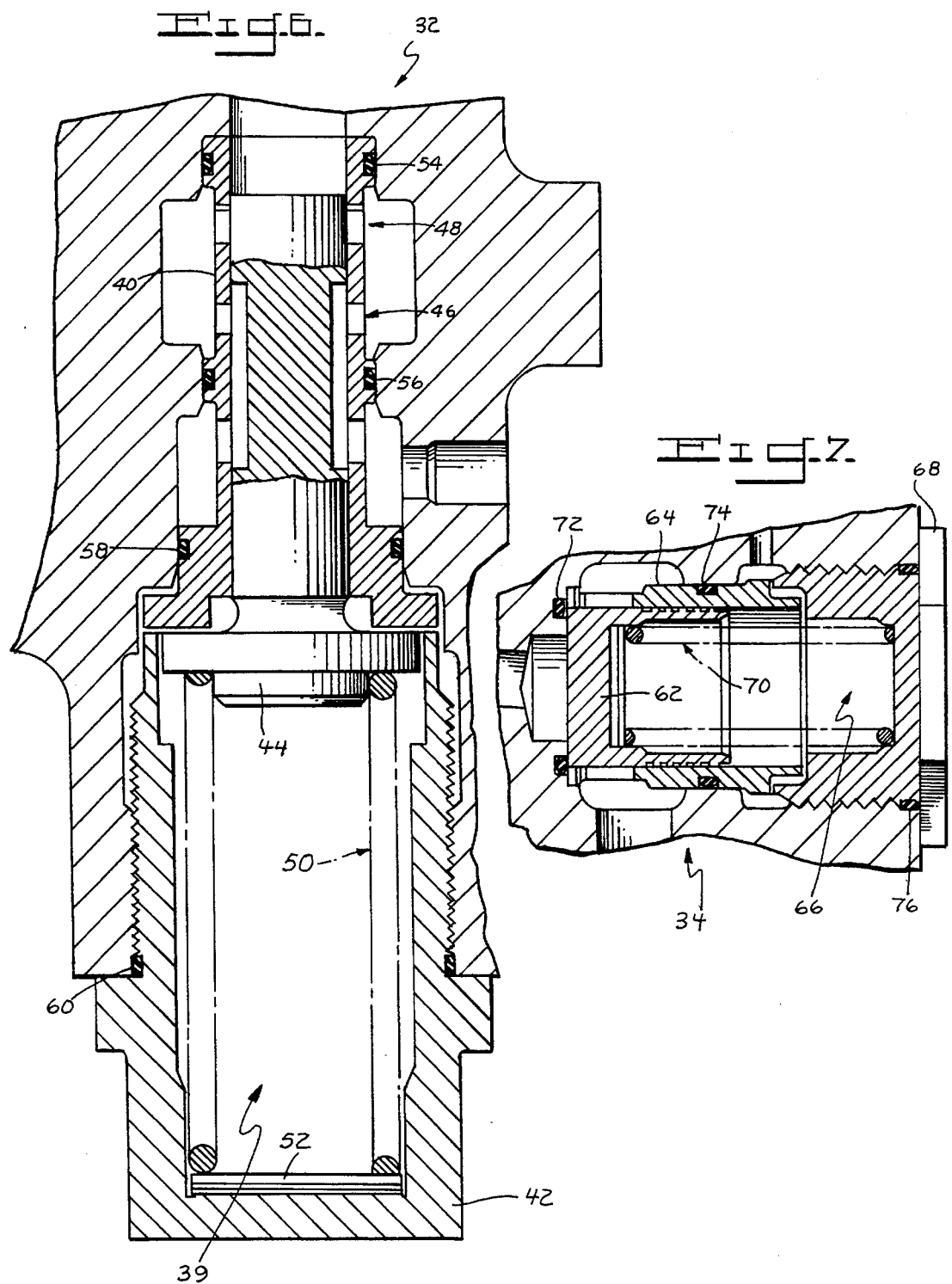

5,456,574

CENTRIFUGAL PUMP WITH STARTING STAGE

This is a continuation of application Ser. No. 08/101,554, filed Aug. 3, 1993, abandoned.

BACKGROUND OF THE INVENTION

This invention relates to centrifugal or rotary fuel pumps. More particularly, it relates to fuel pumps for aircraft gas turbines.

Fuel pumps for aircraft gas turbines traditionally have been positive displacement types, most often gear pumps. These pumps are normally driven at a fixed ratio to engine speed. Positive displacement pumps have two major advantages over centrifugal pumps, which make them attractive for use as gas-turbine fuel pumps. First, this type of pump exhibits good dry suction characteristics, eliminating the necessity of boost pumps for priming. Secondly, positive displacement pumps provide sufficient pressure over a wide range of engine speeds. The pump sizing point typically is the flow and pressure needed for engine light-off at cranking speeds. This sizing criteria, however, results in excessive fuel delivery at higher engine speeds and altitudes, since the pump speed is tied to engine speed. This overflow requires a fuel bypass loop. Bypass and recirculation of fuel, though, results in significant fuel heating.

With the latest fuel efficient engine designs, excessive fuel heating becomes a serious problem. Reduced engine fuel consumption is accompanied by increased engine and lubrication system temperatures. With lower fuel temperatures, fuel/oil heat exchangers are capable of removing more heat from the lubrication oil, reducing the thermal load and therefore size of the air/oil heat exchangers. Associated with the air/oil heat exchangers is a significant drag and weight penalty to the aircraft.

Centrifugal pumping systems offer reduced fuel temperature rise when compared to a positive displacement pump. These rotary pumps can simply be throttled to eliminate excess fuel delivery, so no flow bypass loop is needed. The largest heat savings is at low flows and high engine speeds, where bypass flow in a positive displacement system is at a maximum. Other advantages include increased reliability and decreased weight. Centrifugal pumps are rarely used as aircraft fuel pumps, however, because of their inability to supply adequate pressure at low speeds and their poor dry suction characteristics.

Accordingly, it is the principal object of the present invention to provide a centrifugal fuel pump, for aircraft gas turbines, that overcomes the problems of the prior art.

It is a more specific object to provide an improved centrifugal fuel pump, as above, with a unique starting stage that supplies adequate pressure during engine start-up, as well as good dry suction characteristics.

It is another specific object to provide such a fuel pump with two different styled impellers on opposite sides of the same rotor—namely, a regenerative/liquid-ring pump to be used for start-up and low speeds, and a high-speed centrifugal pump (on the opposite side) to operate during the aircraft's normal operation.

The above and other objects and advantages of this invention will become more readily apparent when the following description is read in conjunction with the accompanying drawings.

SUMMARY OF THE INVENTION

A novel centrifugal fuel pump for aircraft engines is described. It offers an attractive alternative to the fixed displacement pump.

In the preferred embodiment, the invention comprises a rotary pumping system having a main stage with a separate regenerative starting stage, each located on a single rotating shaft driven at a fixed ratio to engine speed. The main stage is a standard high-speed centrifugal impeller with an inlet inducer, where the impeller blades are mounted on one side of a rotor; and the starting stage is a regenerative/liquid-ring pump, whose impeller blades are mounted uniquely on the opposite side of the same rotor. The starting stage provides the necessary pressure and flow at low engine speeds (e.g., engine start-up). Excellent suction characteristics make its liquid-ring pump self-priming. This start-up pump delivers fuel until the main pump has reached a speed sufficient to provide adequate pressure for fuel delivery. At that time, the fuel output is switched, via a valving system, from the starting stage to the main stage.

The preferred valving system comprises a Bypass and Regulating and Mode Transfer Valve ("BRMTV"), which limits pressure rise in the regenerative starting stage and also selects the pump operating mode; and a switching piston which, upon receiving the appropriate signal from the BRMTV, strokes to either activate or deactivate the regenerative start stage by opening or closing off the start stage flow channel.

BRIEF DESCRIPTION OF THE DRAWINGS

FIG. 6 is a cross-sectional view of a Bypass Regulating and Mode Transfer Valve, shown in FIG. 1; and FIG. 7 is a cross-sectional view of a preferred check valve, shown in FIG. 1.

DETAILED DESCRIPTION OF THE PREFERRED EMBODIMENT

Figure 1:
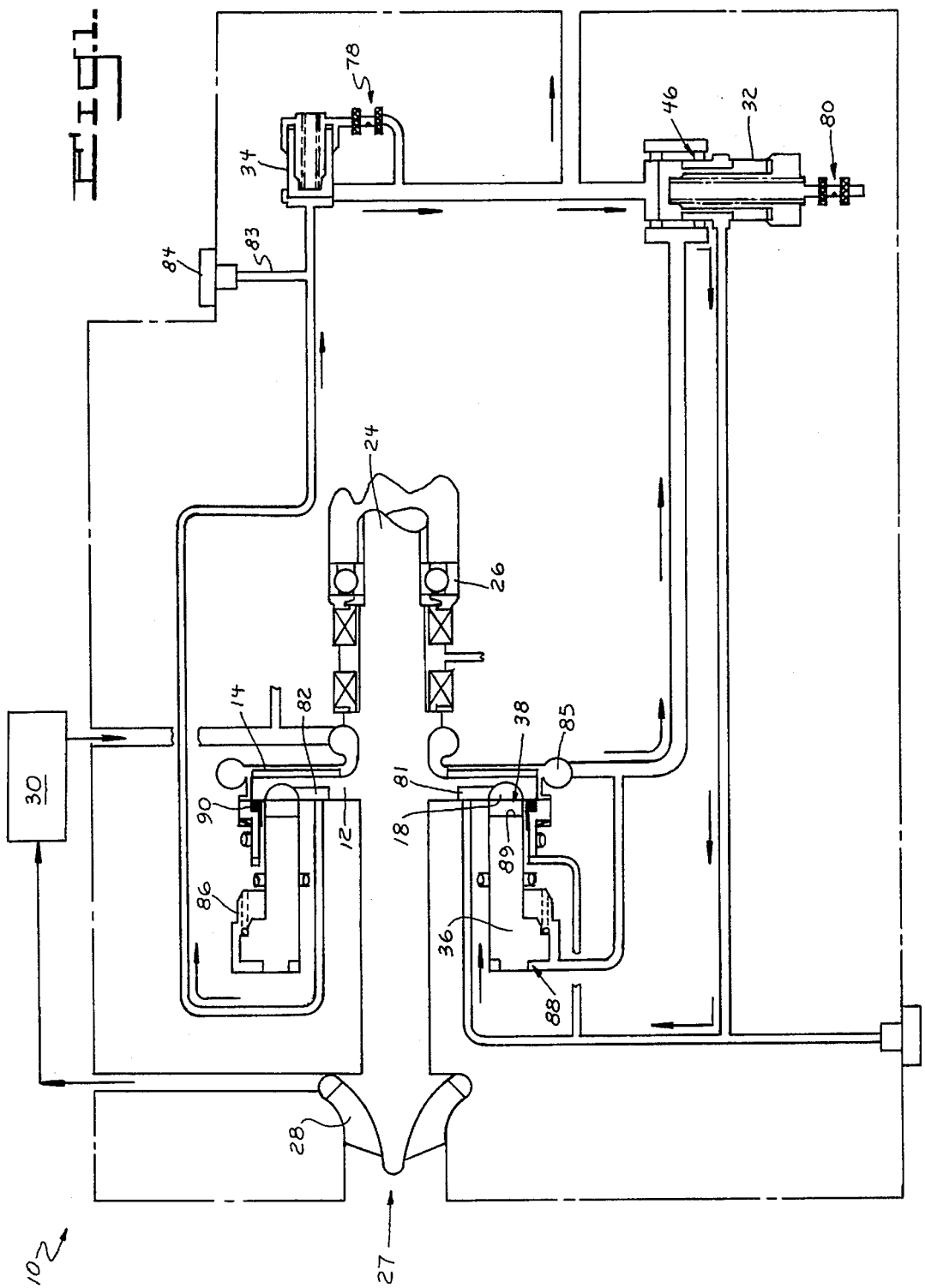
FIG. 1 is a schematic of a preferred embodiment of the invention, showing a "Centrifugal Fuel Pump with Starting Stage", having its starting stage operating in an aircraft's "start" mode.
Figure 2:
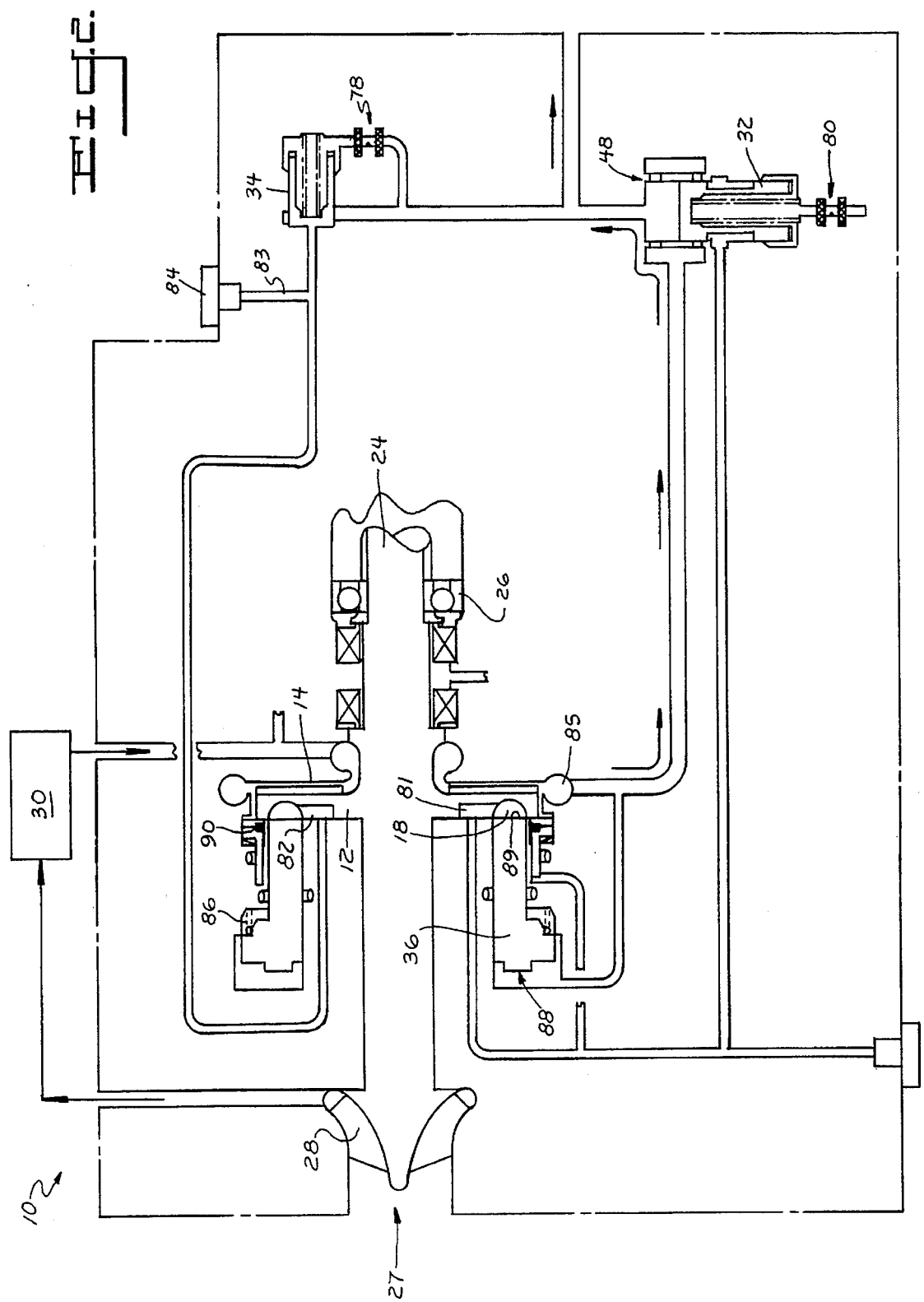
FIG. 2 shows a similar schematic, but with the pumping system's main stage having been switched to operate in the aircraft's "run" mode.
Figure 3:
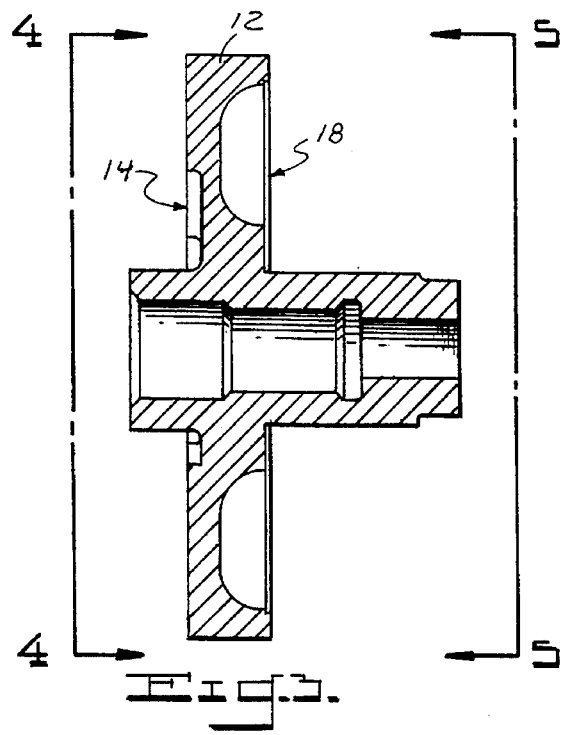
FIG. 3 shows a cross-section of the system's common rotor for two different pumps.
Figures 4, 5:
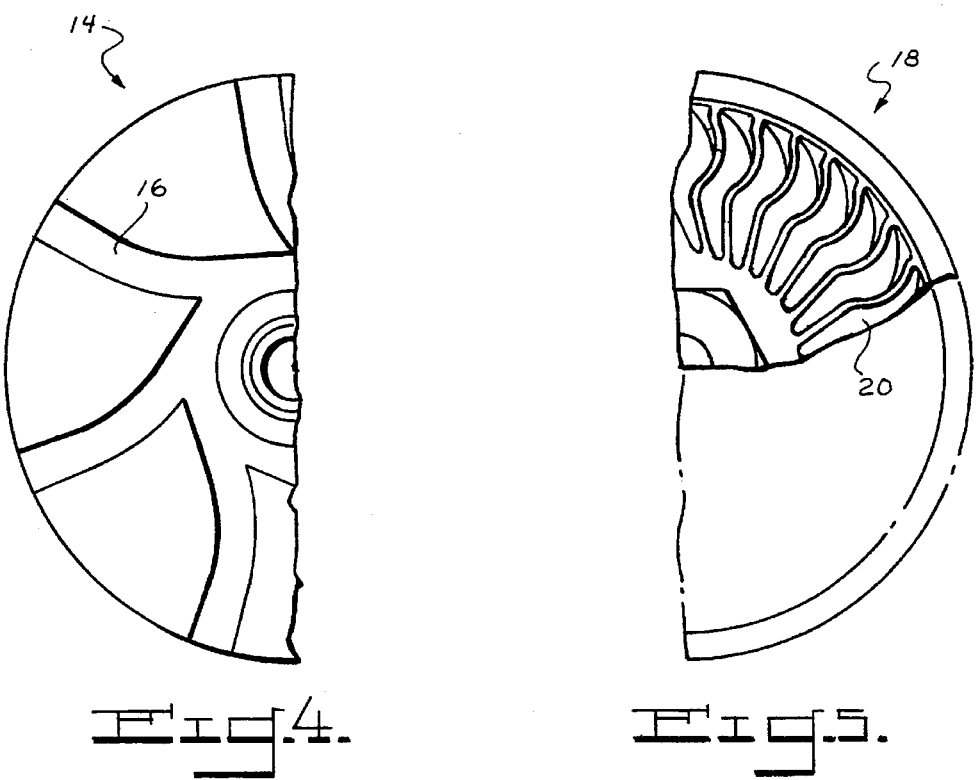
FIG. 4 is a fragmentary view of a centrifugal impeller located on one side of the common rotor.
FIG. 5 is a fragmentary view of a liquid-ring impeller located on the rotor's opposite side.

Referring to the drawings in detail, an improved centrifugal or rotary pumping system 10 for supplying fuel to aircraft gas turbines is shown in FIGS. 1–2. In this preferred embodiment, the pumping system 10 comprises: a rotor 12; a main stage 14 of centrifugal high-speed impeller blades 16 (see FIG. 4) on one side of the rotor 12 (see FIGS. 1–3); a separate regenerative/liquid-ring starting stage 18 of liquid-ring pump blades 20 (see FIG. 5) on the rotor's opposite side (see FIGS. 1– 3); and a valving means 22 that opens or closes fluid communication between the starting stage 18 and main stage 14 depending upon engine speed.

As can be seen in FIGS. 1–2, rotor 12 is centrally mounted on rotor shaft 24. In a standard manner, this shaft is driven by a drive spline (not shown) which plugs into the engine gearbox (also unshown). The shaft 24 is supported by angular contact bearings 26 which are oil mist lubricated.

At the inlet 27 of pumping system 10 is a standard inducer boost stage 28. It is fixedly mounted onto rotor shaft 24 and thus simultaneously rotates with both the main stage 14 and starting stage 18, carried on rotor 12. This inducer is attached by suitable piping to the main stage 14, with a low-pressure filter 30 in between.

The remainder (or valving means) of pumping system 10 consists of: a Bypass Regulating and Mode Transfer Valve 32 (hereinafter "BRMTV"), which limits pressure rise in the regenerative starting stage 18 (i.e., a standard side-channel liquid-ring pump) and also selects the pump's operating mode (e.g., "priming" mode, "starting" mode, or "run" mode); a check valve 34 to prevent back flow into the starting stage 18 during "run" mode in which the main stage 14 operates in lieu of starting stage 18; and a switching piston 36 which, upon receiving the appropriate signal from the BRMTV 32, strokes to either activate or deactivate the regenerative starting stage 18 by opening or closing off the starting-stage flow channel 38 (see FIG. 2).

An integral part of the present invention is BRMTV 32. Its structure is best depicted in FIG. 6. As shown therein, this valve comprises: a chamber 39 with an "upper" sleeve 40 held in position by a cover 42; an main valve body 44 that slides, relative to sleeve 40 and cover 42, within the chamber 39 to selectively open or close a start-stage window 46 or a bypass window 48; a spring 50 that rests against shims 52 inside the cover to bias the main body 44 toward its position shown in FIGS. 1, 6; and various O-rings 54, 56, 58, 60 to provide liquid-tight seals. FIG. 7 best illustrates the check valve 34. Like BRMTV 32, this valve includes a main body 62 that slides inside a sleeve 64 and chamber 66. The sleeve is held in fixed position by a cover 68, and a spring 70, inside the cover, tends to bias the valve to its closed position shown in FIGS. 2, 7. Various O-rings 72, 74, 76 provide liquid-tight seals.

The check valve 34 is connected to a reference line, with a pair of screens and a damper hole at 78. The damper provides dynamic stability. For similar stability, there are a pair of screens and a damper hole (at 80) associated with the BRMTV 32.

During operation of the aircraft's gas turbine, the centrifugal pumping system 10 switches from "priming" mode to "starting" mode, and to normal operation or "run" mode. Those operations are sequentially described below.

The priming mode of pumping system 10 is shown in FIG. 1. Assuming the liquid-ring pump 18 has been previously wet, the locations of the starting stage's central inlet 81 and discharge 82 assure that sufficient fuel is always trapped within this side-channel pump 18 to produce a liquid sealing ring. This ring of liquid provides the sealing and pumping action required for vapor handling. Vapor and/or fuel-vapor mixture is drawn through the BRMTV's start-stage window 46 (see also FIG. 6) to the start-stage inlet 81 and expelled out the discharge 82 and vented overboard through a vent line 83 and bleeder plug 84 or through an automatic vent valve (not shown), until liquid is introduced at the pump inlet 81. Once this occurs, liquid fills the center of the starting stage 18, instantly allowing the liquid-ring pump to perform as a regenerative pump.

FIG. 1 also shows the pumping system's "starting" mode. Once the regenerative/liquid-ring pump 18 is primed, it supplies fuel flow for starting until ignition has occurred and engine speed increases to a value that permits the main stage 14 to sustain pressure and flow.

Fuel is drawn through the inducer 28, filter 30, and main stage 14 to the BRMTV 32, where it is ported through the start-stage window 46 to the start-stage inlet 81. From inlet 81, fuel flows approximately three hundred degrees around the start-stage channel 38 where, the starting stage 18, through its regenerative action, adds pressure to the flow until the pressure and flow required for engine light-off is achieved. Fuel then flows from the outlet 82 of starting stage 18, through check valve 34, and out to the fuel metering unit (not shown). As ignition occurs, and engine speed increases, the BRMTV 32 limits start-stage pressure rise by returning flow in excess of engine and actuator needs, through the bypass window 48, to the main-stage outlet 85, which is in open, fluid communication with the start-stage inlet 81. As engine speed continues to increase to idle speed, main-stage outlet pressure eventually reaches a value roughly equivalent to the pressure that the BRMTV 32 is regulating the starting stage 18 to. When this occurs (at approximately 35% speed), the pressure drop across the BRMTV's bypass window 48 is eliminated, and the BRMTV 32 is no longer able to regulate start-stage outlet pressure. The valve 32 translates to saturate the bypass window 48 wide open (see FIG. 2). In this position, the start-stage window 46 in the BRMTV 32, located in the start-stage inlet line 38, begins to close. As this window 46 closes, a pressure drop occurs across it, causing start-stage inlet pressure to drop. This drop in inlet pressure is sensed by the switching piston 36 (which is biased by spring 86). One piston side 88 is referenced to main-stage outlet pressure, the other 89 to the flow channel 38 of the starting stage 18. By referencing the start-stage flow channel 38, this side 89 of the switching piston 36 sees, in effect, the average of start-stage inlet and outlet pressures. As outlet pressure is reduced by the pressure drop through the BRMTV 32, this average pressure is also reduced. A pressure differential occurs across the switching piston 36, causing it to stroke (to the right, as viewed in FIGS. 1 and 2) and close off the regenerative flow channel 38. At the same time, the start-stage carbon lift seal 90, which senses main-stage outlet pressure on one side and start-stage inlet pressure on the other, lifts from the liquid-ring pump's impeller 20. The regenerative starting stage 18 is now inactive and no longer able to generate sufficient pressure, and the check valve 34 closes. The direction of flow through the BRMTV bypass window 48 reverses and all flow to the engine is supplied by the centrifugal main stage 14. This is shown by flow arrows in FIG. 2, during which the engine can be described as operating in its "run" mode.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A centrifugal pumping system for supplying fuel to an aircraft gas turbine, said system comprising:

a. a rotor adapted to be driven by the turbine;

b. a main-stage pump having a set of centrifugal impeller blades mounted on one side of the rotor;

c. a separate regenerative start-stage pump, in the form of a liquid-ring pump, located on an opposite side of the same rotor and having a set of impeller blades mounted thereon; and d. a valving means that opens or closes fluid communication between the start-stage and main-stage pumps, depending upon engine speed, to activate or deactivate the start-stage pump.

2. The centrifugal pumping system of claim 1, wherein the valving means comprises a Bypass Regulating and Mode Transfer Valve which limits pressure rise in the regenerative start-stage pump and also selects an operating mode of the pumping system.

3. The centrifugal pumping system of claim 2, wherein the valving means further comprises a check valve to prevent back flow into the start-stage pump during "run mode" of the gas turbine, in which the main-stage pump operates in lieu of the start-stage pump.

4. The centrifugal pumping system of claim 3, wherein the valving means further includes a switching piston which straddles a rotor shaft for the pumping system and which, upon receiving an appropriate signal from the Bypass Regulating Mode and Transfer Valve, strokes to either activate or deactivate the regenerative start-stage pump by opening or closing off a starting-stage flow channel.

5. A centrifugal pumping system for supplying fuel to an aircraft gas turbine, said system comprising:
   a. a rotor adapted to be driven by the turbine;
   b. a main stage pump having a set of centrifugal impeller blades mounted on one side of the rotor;
   c. a separate regenerative/liquid-ring start-stage pump, located on an opposite side of the same rotor and having a set of impeller blades mounted thereon; and
   d. a valving means that opens or closes fluid communication between the start-stage and main-stage pumps depending upon engine speed, wherein the valving means comprises:
      i. a Bypass Regulating and Mode Transfer Valve which limits pressure rise in the regenerative start-stage pump and also selects a primary mode, starting mode, or run mode, of the pumping system;
      ii. a check valve to prevent back flow into the start-stage pump during run mode in which the main-stage pump operates in lieu of the start-stage pump; and
      iii. a switching piston which straddles a rotor shaft for the rotor and which, upon receiving an appropriate signal from the bypass regulating and mode transfer valve, strokes to either activate or deactivate the regenerative start-stage pump by opening or closing off a starting-stage flow channel that communicates with the start-stage pump.

* * * * *